Patented Nov. 5, 1935

2,019,744

UNITED STATES PATENT OFFICE 2,019,744

DENATURED ALCOHOL

Herbert G. Stone, Kingsport, Tenn., assignor to Eastman Kodak Company, Rochester, N. Y., a corporation of New York No Drawing. Application February 13, 1935, Serial No. 6,411

9 Claims. (Cl. 202—77)

This invention relates to denaturants for alcohol, and particularly to substances adapted to give a bitter unpalatable taste to alcohol containing them.

It is known that the denaturants hitherto used in some specially denatured alcohols, such, for instance, as rubbing alcohol, do not have a sufficiently bad taste to prevent the diversion of these alcohols to beverage purposes. It is also known that methyl alcohol (methanol), purchased ostensibly for use as a solvent or for use as an anti-freeze in automobile radiators, is sometimes consumed as a beverage, intentionally or otherwise. N-propyl alcohol, iso-propyl alcohol, and butyl alcohol are used for various purposes and frequently need denaturing to avoid disastrous use as a beverage. In other words, the alcohols referred to herein are ones having less than five carbon atoms.

I have discovered that alcohols having less than five carbon atoms and containing a small amount of sucrose-acetate have such an extremely bitter taste that most persons are unable to drink them. Even one part per million of sucrose-acetate confers a bitter taste on alcohol, but for denaturing, I prefer to use at least 0.1% to 0.2% sucrose octa-acetate, as the alcohol is often diluted in making up a beverage, and the repulsiveness of the taste of sucrose octa-acetate varies somewhat among individuals.

Sucrose octa-acetate is a solid compound which has been known for several decades. It may be prepared, for instance, by refluxing sucrose with sodium acetate and a large excess of acetic anhydride at 135° C., and running the reaction mixture into water or toluene to precipitate the sucrose octa-acetate.

While I may add the solid sucrose octa-acetate directly to the alcohol to be denatured, I find it convenient to make up a denaturant base by dissolving a relatively large proportion of sucrose octa-acetate in one of the alcohols mentioned. It is convenient to employ the same alcohol as is being denatured although this is not necessary. This forms a convenient denaturing material for use by denaturing plants.

For example, I may prepare a denaturant base by adding 5.7 grams of sucrose octa-acetate to 100 cc. of the specially denatured alcohol currently designated by the United States Government as specially denatured alcohol #23—A, made up by adding 10 gallons of acetone to 100 gallons of 190-proof ethyl alcohol. Usually from 2 to 10 parts of such a denaturant base are appropriate for denaturing 100 parts of ethyl alcohol.

Obviously, the denaturant base may have a concentration of sucrose octa-acetate anywhere from 0.1% to saturation, since it is merely a convenient vehicle for introducing the sucrose octa-acetate quickly into the alcohol to be denatured. Of course, the number of parts of denaturant base to be used in denaturing 100 parts of alcohol will vary inversely with the concentration of sucrose octa-acetate in the base.

Alcohol denatured with sucrose octa-acetate is suitable for a number of uses requiring specially denatured alcohol. For instance, in making up rubbing alcohol, in the manufacture of varnish, as an anti-freeze, etc.

Sucrose octa-acetate does not serve to completely denature alcohol, inasmuch as the alcohol may be distilled off, leaving the sucrose octa-acetate behind. If it is desired that the alcohol retain a bitter or repulsive taste after distilling, to serve as an infallible warning signal that the alcohol is unfit to drink, a volatile material with an unpleasant taste and/or odor, such, for example, as camphor, diacetone alcohol, 1:4 dioxan, or the denaturant described in the recent patents to Louis Figg, may be added to the alcohol in addition to the sucrose octa-acetate.

I may add sucrose octa-acetate to methyl alcohol as a denaturant to warn persons attempting to drink methyl alcohol that it is not intended for a beverage, and to inhibit its consumption as such. Methyl alcohol so denatured is suitable as an anti-freeze, as a solvent for cutting shellac, and for many other of the uses of methyl alcohol. The same may be said of the propyl and butyl alcohols. Its utility with ethyl alcohol is obvious from the foregoing.

My novel denaturant has the very decided physiological advantage that it is non-poisonous and that, in the concentrations suitable for denaturing, it is a violent emetic. Thus when it is used to denature methyl alcohol it prevents the imbiber from unwittingly causing his own death, since the stomach almost immediately ejects the alcohol. The same is true with respect to the other alcohols mentioned, whether poisonous or not.

What I claim as my invention and desire to be secured by Letters Patent of the United States:

1. A denatured alcohol of less than five carbon atoms, containing sucrose octa-acetate.

2. Denatured propyl alcohol containing sucrose octa-acetate.

3. Denatured ethyl alcohol containing sucrose octa-acetate.

4. Denatured methyl alcohol containing sucrose octa-acetate.

5. A denatured alcohol of less than five carbon atoms, containing at least 0.1% of sucrose octa-acetate.

6. Denatured propyl alcohol containing at least 0.1% of sucrose octa-acetate.

7. Denatured ethyl alcohol containing at least 0.1% of sucrose octa-acetate.

8. Denatured methyl alcohol containing at least 0.1% of sucrose octa-acetate.

9. A denatured alcohol of less than five carbon atoms, containing approximately 0.1% to 0.2% of sucrose octa-acetate.

HERBERT G. STONE.